United States Patent Office 3,486,871
Patented Dec. 30, 1969

3,486,871
LEAD TITANATE-CONTAINING, CRYSTALLIZ-
ABLE SEALING GLASSES AND METHOD
Francis W. Martin, Painted Post, N.Y., assignor to
Corning Glass Works, Corning, N.Y., a corporation of New York
No Drawing. Filed Oct. 2, 1964, Ser. No. 401,221
The portion of the term of the patent subsequent to
Nov. 12, 1985, has been disclaimed
Int. Cl. C03c 17/04
U.S. Cl. 65—33         3 Claims

ABSTRACT OF THE DISCLOSURE

A sealing glass composition which undergoes reduction in coefficient of thermal expansion when thermally devitrified consisting essentially in weight percent of from 60% to 80% of PbO, up to 20% of at least one divalent metal oxide selected from the group consisting of ZnO and BaO, the total of divalent metal oxides including PbO being from 60% to 80%, from 5% to 18% $TiO_2$, at least 1% $B_2O_3$ and at least 5% $SiO_2$ being from 10% to 20%, and containing perovskite lead titanate after devitrification.

The invention also includes a process for producing a thermally devitrifying glass seal by applying to a sealing surface having a thermal coefficient of expansion below about $80 \times 10^{-7}$ a frit of a thermally devitrifiable glass having the above composition, heating the frit to a temperature not exceeding 625° C. to effect a seal between the glass and the surface and holding the seal at that temperature for a time not exceeding one hour to cause a separation of phases into a vitreous phase and a crystalline phase wherein the predominant crystal is perovskite type lead titanate.

---

This invention relates to thermally devitrifiable sealing glasses and their use in forming seals in composite articles.

As used herein, a "seal in a composite article" includes a layer of material bonding together preformed parts, as well as a layer of material applied over and adherently bonded to a preformed surface in the nature of an enamel or glaze. In either type of seal, the essential feature is a continuous layer of sealing material that wets the preformed sealing surface and forms a tenacious bond with the surface.

A thermally "devitrifiable" sealing glass is one capable of forming a conventional fused vitreous seal and thereafter undergoing a thermally induced, nucleated type of crystallization whereby the glass separates into a glassy phase and a crystalline phase, the latter being composed of fine crystals having a relatively uniform size and distribution. The resulting layer of sealing material has essentially uniform physical characteristics which ordinarily differ from those of the parent glass.

Thermally devitrifiable glass of the present type differs from an opacifiable glass both in the amount and nature of crystalline material formed, and in the effect on the physical properties and characteristics. The crystal particles in an opal glass normally comprise no more than about 5% of the glass and normally create no substantial change in any physical characteristic of the glass, other than its light transmission.

It is familiar practice in the glass sealing art to employ soft (that is, low melting point) glasses, commonly known as solder glasses, to bond together ceramic and/or metal parts. The art of enameling or glazing ceramic and metal surfaces, either for decorative or protective purposes, involves the same basic considerations. Glazing compositions are vitreous materials capable of being thermally matured at a temperature below the distortion temperature of the surface to which they are applied. The resulting glaze or enamel is sufficiently well matched to the substrate in thermal expansion characteristics to avoid checking or other deterioration due to stresses created by cooling of the composite.

The scope of solder sealing glass practice was greatly enlarged recently when the concept of thermally devitrifiable sealing glasses was introduced. The concept and practice of this sealing technique is described in detail in United States Patent No. 2,889,952 issued to S. A. Claypoole.

Briefly, an ordinary soft or solder sealing glass seal is formed in the usual manner by applying the glass material to a sealing surface and heating to the glass sealing temperature. The vitreous seal is then held at or about the sealing temperature for a period of time not exceeding about one hour. During this time, the sealing glass undergoes phase separation, that is, separation into a crystalline phase and a residual glass phase. By suitable nucleation, either by applying the sealing glass in powder form initially, or by including a nucleating agent in the glass, the crystal phase separates as fine crystals which are distributed substantially uniformly throughout the sealing material. Development of the crystal phase tends to harden the sealing material whereby it becomes relatively rigid and capable of withstanding pressure at, or even above, the sealing temperature.

The previously mentioned Claypoole patent discloses a family of lead-zinc-borate, thermally devitrifiable sealing glasses that are particularly adapted to producing seals with materials or components having thermal coefficients of expansion on the order of $80$–$120 \times 10^{-7}$. That is, the devitrified glass seal resulting from thermal devitrification of the sealing material in situ on the sealing surface produces a material having thermal expansion characteristics compatible with material in the indicated expansion range.

Thermal coefficient of expansion is in units per ° C. wherever used and is an average value over a selected temperature range. While the actual effective range is below the setting point of a glass, the usual practice is to state the average expansion coefficient over a range of 0–300° C., there usually being no more than a small difference in values. Therefore, unless otherwise indicated, such range is intended.

My recently issued United States Patent No. 3,113,878 describes a family of zinc-silicoborate glasses which are designed to meet the need for thermally devitrified sealing materials compatible with materials in the 30–50 expansion range. The latter are quite satisfactory in most respects, but have one rather distinct handicap. These glasses normally require a sealing schedule of about one hour at 750° C. to mature adequately and to undergo crystal phase separation in the seal. In general, this limits their use to non-vitreous materials and very hard glasses, such as aluminosilicates, that are sufficiently refractory to withstand such thermal treatment without sagging or other distortion. The requirement for thermal treatment at elevated temperatures is also a serious handicap in sealing electronic components and the like which are often quite sensitive to such temperatures.

A similar problem has arisen in conjunction with enameling or glazing of relatively low expansion glassware, in particular kitchen and tableware articles produced from borosilicate glasses having thermal expansion coefficients in the range of $30$–$50 \times 10^{-7}$. Ordinary commercial enamels and glazes are generally designed for use on soda lime glasses having expansion coefficients in the general range of $80$–$100 \times 10^{-7}$. It is quite possible to lower the expansion coefficients of such enamels or glazes by suitable composition changes, but this practice invariably increases the so-called firing or maturing temperature of the vitreous material to such an extent that deformation of the glass being coated occurs. This is particularly true for thin blown ware, such as carafes, pitchers, containers and the like.

Thus, there has existed a distinct need for thermally devitrifiable sealing glasses capable of producing seals in conjunction with materials having thermal coefficients of expansion below about $70 \times 10^{-7}$ and particularly for glasses compatible with materials having expension coefficients below about $50 \times 10^{-7}$. At the same time, it is necessary that the glasses have a maturing temperature lower than 700° C. and preferably aroundt 600° C. In referring to a specific maturing temperature, this does not mean that the material cannot or will not devitrify at other temperatures, but does mean that it will phase separate or crystallize to an adequate extent at the indicated temperature (600° C.) in a period of time not exceeding and preferably less than one hour.

It is a primary purpose of the present invention to meet the indicated need and supply thermally devitrifiable sealing glasses having the indicated desired characteristics. It is a further purpose to provide such glasses having characteristics that particularly adapt them to either bonding or coating purposes. Another purpose is to provide a novel type of seal and method of production.

I have now discovered that these and other purposes can be met with a family of lead borosilicate glasses containing titania as an essential additive with various other oxides being optional additives. I have further found that these new glasses characteristically undergo rather marked decreases in thermal coefficient of expansion as they crystallize, that is, as they are thermally separated into a crystal and a glassy phase. Because of this characteristic, it is possible to produce a vitreous seal with a solder glass having expansion characteristics on the order of 90 or greater, and a correspondingly low sealing temperature, which, after crystallization, produces a sealing material compatible with a sealing surface of much lower expansion coefficient. Depending on the sealing glass, it may be used on a sealing surface having an expansion as high as 80 or as low as 0 to 10, the characteristic expansions of high silica materials and low expansion glass ceramics.

Based on these findings and in accomplishment of the indicated purposes, my invention resides in a thermally devitrifiable sealing glass composition that is capable of thermally induced devitrification within a period of about a half hour at a temperature within a range of from about 500° to 650° C., with a coincident decrease in thermal coefficient of expansion, the glass being composed essentially of 60–80% PbO, 0–20% of at least one other divalent metal oxide selected from the group consisting of ZnO and BaO, the total divalent metal oxide content being 60–80%, 5–18% $TiO_2$, at least 1% $B_2O_3$, and at least 5% $SiO_2$, the total of $B_2O_3$ plus $SiO_2$ being 10–20%.

The invention also contemplates the method for producing seals with the sealing glasses of the invention and the resulting products.

The essential glass-forming oxides are silica ($SiO_2$) and boric oxide ($B_2O_3$). It is necessary that the total content of these glass-forming oxides be at least 10% by weight of the glass batch, as calculated on an oxide basis, to permit proper melting of the glass batch, particularly in the presence of a relatively high titania ($TiO_2$) content. On the other hand, relatively large amounts of these oxides, either individually or collectively, tend to stabilize the present glasses and prevent the desired crystal phase formation, at least within a reasonable time.

Consequently, the total content of these two oxides should not exceed about 20%. On an individual basis, increasing the boric oxide content of a given glass tends to soften or lower the melting point of the glass and slow down the rate at which devitrification occurs in the sealing process, while decreasing the chemical durability of the sealing material particularly with respect to acids.

Increasing $SiO_2$ at the expense of $B_2O_3$ has essentially an opposite effect in that it tends to harden the glass, increase its acid durability and accelerate devitrification. The ratio of $B_2O_3$ to $SiO_2$ may then be varied within the indicated ranges depending on the particular glass characteristics desired. For sealing purposes, it is preferable that these oxides be present in a ratio of about 1:1.

The major glass constituent is lead oxide (PbO) and this oxide is required to give the expansion decrease that characterizes the present glasses as they crystallize. With less than about 60% PbO, the glass either undergoes inadequate devitrification within a reasonable time or the crystal phase that does separate does not provide the type or degree of expansion change desired for present purposes. On the other hand, to the extent that glasses can be melted with over 80% PbO, the desired crystallization cannot normally be attained.

Among the other divalent metal oxides, zinc oxide (ZnO) and/or barium oxide (BaO) are particularly useful and may be substituted in amounts of up to about 20%, providing the total of divalent metal oxides, PbO plus ZnO and/or BaO, does not exceed 80%. The presence of ZnO appears to lower the expansion coefficient in the residual matrix glass after crystallization, whereas BaO tends to improve the chemical durability of this glass and hence the durability of the sealing material. However, both of these oxides tend to produce other crystalline phases than that desired, if present in too large amounts. Also, the presence of zinc oxide tends to promote an undesirable interfacial reaction on borosilicate surfaces except as up to about 2% alumina ($Al_2O_3$) is present to stabilize the glazing glass.

The primary role of titania ($TiO_2$) appears to be development of a suitable low expansion crystal material, lead titanate, during thermal treatment. At least 5% of titania ($TiO_2$) is required for crystallization purposes. In general, amount of $TiO_2$ above about 12% enable more rapid maturing of the crystalline sealing material, but thereby interfere with proper flow characteristics in a bonding type seal. Also, the decrease in effective expansion coefficient of the phase separated glass tends to become greater with increase in $TiO_2$ content. However, it becomes difficult to assimilate large amounts of $TiO_2$ into the present glasses without employing flux oxides, such as the alkali metal oxides that tend to stabilize a higher expansion, cubic lattice type of crystal.

In general, glasses composed of essentially 60–80% PbO, 0–20% BaO plus ZnO, 5–12% $TiO_2$, 10–20% $B_2O_3$ plus $SiO_2$ collectively, and at least 5% of $B_2O_3$ and $SiO_2$ individually, are well suited to production of a bonding or intermediate type seal where flow is necessary to provide good wetting of the opposed surfaces and good geometry in the seal. For glazing of low expansion ware, however, where such flow is unnecessary, the most useful glasses are composed essentially of 60–80% PbO, 12–18% $TiO_2$ and 10–16% $B_2O_3$ plus $SiO_2$, the glass containing 1–8% $B_2O_3$ and at least 5% $SiO_2$.

The present glasses may be melted in conventional manner. Ordinary batch materials, such as red lead, boric acid, pulverized sand and titania are mixed in suitable amounts calculated to produce a glass of desired composition and melted in a platinum crucible or small continuous melting unit at temperatures on the order of 1200–1300° C., until a suitably homogenized melt is obtained. After proper homogenization, the molten glass is preferably quenched by running a stream into cold water or between cold metal rollers in order to avoid premature crystallization within any part of the glass. The glass is then dried and ground to a suitable size for application to a sealing surface either as a slip, or as preformed sealing gaskets or the like. The assembly is then heated on a schedule adapted to burn out or volatilize organic materials and soften the powdered sealing glass to a continuous yieldable layer suitable for forming the desired seal.

It will be appreciated that the glass should remain essentially free of crystallization until after a proper seal is formed. In the case of bonding parts together, this normally requires that the sealing glass flow is sufficient to provide a desirable seal geometry. On the other hand, such flow is normally unnecessary in enameling or glazing, but it is at least necessary that the glass thoroughly wet the sealing surface. However, rather rapid devitrification is normally desirable in enamel-type coatings in order to avoid reaction between the sealing glass and the underlying glass substrate. It has been found that such reaction tends to produce an intermediate glass material which may lead to checking or other weakening of the glass seal.

As the present glasses, particularly those with $TiO_2$ contents over about 10%, crystallize under thermal treatment, the initial crystal phase that separates is frequently a cubic lattice crystal of lead titanate that imparts a bright yellow color. This is a rather high expansion type crystal which is generally ineffective for present purposes, at least in the present glasses having $TiO_2$ contents below about 18%. Further heat treatment involving longer times and/or higher temperatures converts this cubic crystal to a crystal of perovskite structure which is the desired low expansion type of lead titanate crystal.

With $TiO_2$ contents of 5–10%, the yellow, cubic crystal either does not form or converts readily to the perovskite form at sealing temperatures of 500–600° C. Above 10%, the cubic crystal is more pronounced, but it is still converted to the perovskite structure at temperatures of 600–650° C. As the $TiO_2$ content is increased, the temperature required for conversion increases and becomes too high for most sealing purposes above about 18%. This crystal conversion is also influenced by composition. The presence of alkali metal oxides, or certain alkaline earth oxides such as MgO, tends to stabilize the yellow, cubic crystal phase. Also, an increase in $SiO_2$ at the expense of $B_2O_3$ tends to have a similar effect, so that higher conversion temperatures are required.

By way of further illustrating the invention, reference is made to the following table in which a number of exemplary glass compositions are set forth on an oxide basis together with characteristic properties of glasses melted from such compositions. In the table, "Expansion" is the average thermal coefficient of expansion of the glass times $10^{-7}$ after devitrification and between the material setting point and room temperature. "Seal Temperature" is a temperature at which the glass seals and devitrifies in half an hour. The compositions are calculated in percent by weight from the glass batch.

TABLE

|  | 1 | 2 | 3 | 4 | 5 | 6 | 7 | 8 |
|---|---|---|---|---|---|---|---|---|
| PbO | 65 | 68 | 63 | 68 | 63 | 63 | 68 | 73 |
| ZnO | 15 | 10 | 5 | 5 | 10 | 10 |  |  |
| BaO |  |  | 5 |  |  |  | 5 |  |
| $B_2O_3$ | 7.5 | 7.5 | 7.5 | 7.5 | 6.5 | 5.5 | 7.5 | 5 |
| $SiO_2$ | 7.5 | 7.5 | 7.5 | 7.5 | 6.5 | 6.5 | 7.5 | 8 |
| $TiO_2$ | 5 | 7 | 12 | 12 | 12 | 13 | 12 | 14 |
| $Al_2O_3$ |  |  |  |  | 2 | 2 |  |  |
| Expansion | 66 | 70 | 54 | 52 | 48 | 48 | 65 | 48 |
| Seal temp., ° C. | 550 | 555 | 600 | 600 | 620 | 620 | 620 | 620 |

Examples 1–4 are compositions of glasses that have been found effective for producing bond type seals. Example 2 has proven well suited for sealing to crystalline alumina ceramics and Example 4 is particularly adapted for sealing with a low expansion iron-nickel-cobalt alloy.

These glasses, as melted, have average thermal coefficients of expansions between the glass setting points (400–450° C.) and room temperature of $90-100 \times 10^{-7}$ units. After thermal crystallization at the sealing temperature for one hour, the resulting material has the indicated expansion coefficient times $10^{-7}$ as calculated from stress measurements made on seals to glasses of known expansion value.

Examples 5–8 are compositions of glasses found to be particularly suitable for enameling or glazing purposes. In particular, these glasses are adapted to use on ware blown from a commercial borosilicate glass having an average coefficient of expansion of $33 \times 10^{-7}$. The glass of Example 8, for instance, was applied to thin blown carafes through decorating screens and fired at 620° C. for half an hour to mature the glaze. The ware has impact strength of over 0.40 units and good acid durability as compared to a strength of 0.1–0.2 units on abraded, uncoated ware and 0.02–0.05 units on commercial enameled ware.

While the sealing glasses and method are of particular value in producing bonding seals and glazes on ceramic substrates having relatively low coefficients of thermal expansion, for example, $70 \times 10^{-7}$ or below, they may also be employed as seals and glazes on other glass and metallic materials.

What is claimed is:
1. A method for producing a thermally devitrified glass seal comprising the steps of
    applying to a refractory sealing surface having a thermal coefficient of expansion below about $80 \times 10^{-7}$ a frit of a thermally devitrifiable glass, said glass consisting essentially in weight percent of from 60% to 80% of PbO, from 5% to 18% $TiO_2$, at least 1% $B_2O_3$ and at least 5% $SiO_2$, the total of $B_2O_3$ and $SiO_2$ being from 10% to 20%,
    heating the frit to a temperature between about 500° and about 650° C. to effect a fusion seal between the glass and the surface, and
    holding said fusion seal at said temperature for a sufficient time not exceeding one hour to cause said glass to separate into a vitreous phase and a substantially uniformly distributed crystalline phase in which the predominant crystal is perovskite type lead titanate.

2. The method of claim 1 wherein said glass further contains up to 20% of at least one divalent metal oxide selected from the group consisting of ZnO and BaO, the total of PbO, ZnO and BaO being from 60% to 80%.

3. The method of claim 2 wherein said glass further contains up to about 2% $Al_2O_3$.

References Cited

UNITED STATES PATENTS

| 2,920,971 | 1/1960 | Stookey | 106—39 |
| 2,956,219 | 10/1960 | Cianchi | 106—39 |
| 3,063,198 | 11/1962 | Babcock | 106—39 |
| 3,258,350 | 6/1966 | Martin et al. | 106—53 |
| 2,889,952 | 6/1959 | Claypoole | 106—39 X |
| 3,384,508 | 5/1968 | Bopp et al. | 106—54 X |

HELEN M. McCARTHY, Primary Examiner

W. R. SATTERFIELD, Assistant Examiner

U.S. Cl. X.R.

65—36; 106—39, 49, 53; 117—129